US008695078B2

(12) United States Patent
Low et al.

(10) Patent No.: US 8,695,078 B2
(45) Date of Patent: *Apr. 8, 2014

(54) GROUP FORMATION USING ANONYMOUS BROADCAST INFORMATION

(71) Applicant: Apple Inc., Cupertino, CA (US)

(72) Inventors: Daryl Mun-Kid Low, Cupertino, CA (US); Ronald Keryuan Huang, San Jose, CA (US); Puneet Mishra, Santa Clara, CA (US); Gaurav Jain, Guelph (CA); Jason Gosnell, San Francisco, CA (US); Jeffrey Alan Bush, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/708,122

(22) Filed: Dec. 7, 2012

(65) Prior Publication Data

US 2013/0104221 A1    Apr. 25, 2013

Related U.S. Application Data

(63) Continuation of application No. 12/233,358, filed on Sep. 18, 2008, now Pat. No. 8,359,643.

(51) Int. Cl.
*H04L 29/06* (2006.01)

(52) U.S. Cl.
USPC .............. 726/9; 370/328; 370/315; 370/254; 370/389; 455/456.3; 455/525; 713/155

(58) Field of Classification Search
USPC .............. 455/456.3, 526; 370/254, 315, 328, 370/389; 713/155; 726/9
See application file for complete search history.

(56) References Cited

U.S. PATENT DOCUMENTS

| | | | |
|---|---|---|---|
| 6,738,808 B1 * | 5/2004 | Zellner et al. | 709/223 |
| 2007/0237096 A1 * | 10/2007 | Vengroff et al. | 370/254 |
| 2009/0201850 A1 * | 8/2009 | Davis et al. | 370/328 |
| 2010/0054242 A1 * | 3/2010 | Oliver et al. | 370/389 |

* cited by examiner

*Primary Examiner* — Brandon Hoffman
*Assistant Examiner* — Hee Song
(74) *Attorney, Agent, or Firm* — Fish & Richardson P.C.

(57) ABSTRACT

A number of devices co-located at a geographic location can broadcast and receive tokens. Tokens can be exchanged using a communication link having limited communication range. Tokens that are received by a device can be stored locally on the device and/or transmitted to a trusted service operating remotely on a network. In some implementations, the tokens can be stored with corresponding timestamps to assist a trusted service in matching or otherwise correlating the tokens with other tokens provided by other devices. The trusted service can perform an analysis on the tokens and timestamps to identify devices that were co-located at the geographic location at or around a contact time which can be defined by the timestamps. A group can be created based on results of the analysis. Users can be identified as members of the group and invited to join the group.

23 Claims, 9 Drawing Sheets

GROUP FORMATION USING ANONYMOUS BROADCAST INFORMATION

CROSS-REFERENCE TO RELATED APPLICATIONS

This application is a continuation application of U.S. patent application Ser. No. 12/233,358, filed Sep. 18, 2008, and which is incorporated here by reference.

TECHNICAL FIELD

This subject matter is generally related to data communications between electronic devices.

BACKGROUND

Social networking has revolutionized the way people communicate and share information with one another. Online social networks are communities of individuals who share interests and activities or who are interested in exploring the interests and activities of others. Many social network services are web-based and provide a collection of various ways for users to interact, such as chat, messaging, email, video, voice chat, file sharing, blogging and discussion groups. Social network websites typically provide tools and communication infrastructures for organizing and managing social networks.

During private or public events (e.g., concert, tradeshows, business meetings, weddings, rallies), a typical individual may have many brief contacts with individuals for which they would like to have further correspondence post event. With conventional social network websites, the individual would have to collect personal information from the contacts, manually create a social network on the social network website and invite the contacts to join. Some of the contacts, however, may not be registered with the social network website, and will have to register before joining the social network.

Modern wireless devices can operate in an ad hoc mode (e.g., Bluetooth personal area network (PAN) or piconet) which allows wireless devices within range of each other to discover and communicate in peer-to-peer fashion without involving central access points. The ad hoc network, however, only exists while the participating devices are in close proximity to each other. There is no facility for regenerating the network at a later time to allow users to continue discussions or exchange content. Users who wish to participate in a PAN have to manually configure their devices or adaptors to do so, which can be tedious and time consuming. The informal nature of ad hoc networks, coupled with the lack of a centralized and secure access points, makes ad hoc networks susceptible to snooping and other attacks.

SUMMARY

A number of devices co-located at a geographic location can broadcast and receive tokens. Tokens can be exchanged using a communication link having limited communication range. Tokens that are received by a device can be stored locally on the device and/or transmitted to a trusted service operating remotely on a network. In some implementations, the tokens can be stored with corresponding timestamps to assist a trusted service in matching the tokens with tokens provided by other devices. The trusted service can perform an analysis on the tokens and timestamps to identify devices that were co-located at the geographic location at a given contact time which can be determined by the timestamps. A group can be created based on results of the analysis. Users of the Group devices can be invited to join a group. User interfaces, filters and search engines can be provided to the users to enable users to search and manage groups. The groups can be used with various applications (e.g., calendars, address books, email, instant messaging) to provide additional content and services to the users. If the geographic location of the group at the contact time is known, then members of the group can be targeted to receive location-based services (LBS) and content.

DETAILED DESCRIPTION

System Overview

Figure 1:
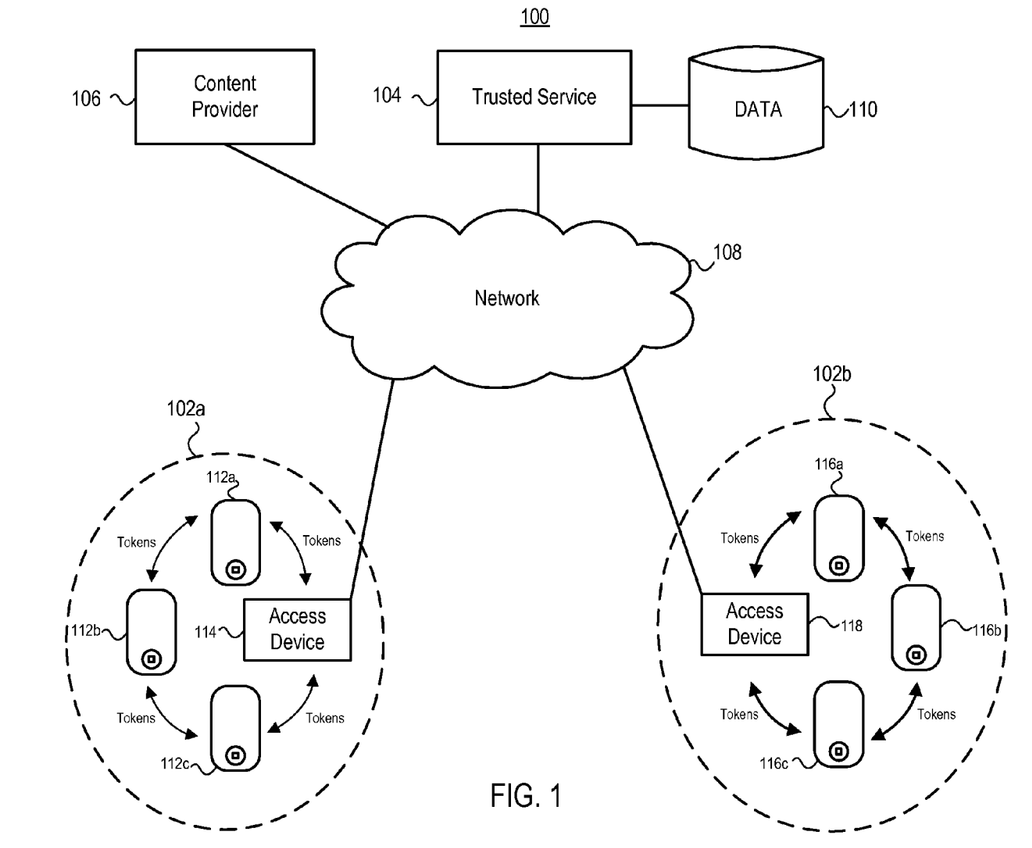
FIG. 1 illustrates an example system that allows group formation based on anonymous broadcast information.

FIG. 1 illustrates an example system 100 that allows group formation based on anonymous broadcast information. In some implementations, the system 100 generally includes one or more groups 102 coupled to a trusted service 104 through one or more networks 108 (e.g., the Internet, wireless network). In the example shown, the group 102a includes a set of devices 112a . . . 112c and the group 102b includes a set of devices 116a . . . 116c. The group 102a also includes an access device 114, for providing the devices 112 with access to the network 108. The group 102b includes an access device 118, for providing the devices 116 with access to the network 108.

The devices 112 can be any device capable of communicating with another device, including but not limited to: notebook computers, desktop computers, mobile phones, smart phones, email devices, set-top boxes, game consoles, personal digital assistants (PDAs), media players, digital cameras, video cameras, etc. The access devices 114, 118 can be any device capable of providing access to a network, including but not limited to: routers, hubs, interface cards, host computers and any one of the devices 112, 116 described above. One or more of the devices 112 can have access to the external network 108, either directly or indirectly through the access devices 114, 118. Internet Protocol (e.g., IPv4) can be used for external communication with network resources, such as the trusted service 104 and one or more content providers 106.

In some implementations, the devices 112, 116 in group 102a can exchange tokens while within transmission range of each other. The access devices 114, 118 can also exchange tokens with the devices 112, 116, respectively. For example, the device 112*a* can exchange tokens with devices 112*b* and 112*c*, as well as access device 114. Similarly, the device 112*b* can exchange tokens with devices 112*a* and 112*c*, as well as access device 114. The device 112*c* can exchange tokens with the devices 112*a* and 112*b*, as well as the access device 114. The access device 114 can exchange tokens with any of the devices 112*a*, 112*b* and 112*c*. The devices 116 and access device 118 in group 102*b* have similar capabilities and need not be described here.

The system 100 can include any number of groups, and each group can include any number of devices and access devices. In some implementations, a group does not have a dedicated access device 114, 118. In such an implementation, any one or more of the devices 112, 116 can function as an access device for other devices in the group. A groups is defined as one or more devices that are in transmission range of each other for a period of time, referred to as a "contact time." A contact time can occur during private or public events or meetings. For example, members of a group can include attendees at a concert or sporting event, attendees at a business meeting, attendees at a tradeshow, attendees at an event or party, etc.

A token is a snippet or chunk of data that can be broadcast by a device to other devices that are within the transmission range of the broadcasting device. Tokens can be matched or otherwise correlated with other tokens by the trusted service 104, as will be described in reference to FIG. 2. In some implementations, a token can be a cryptographic key generated by a cipher running on the broadcasting device. Some examples of ciphers include but are not limited to: block ciphers, stream ciphers, symmetric key algorithms (e.g., triple-DES, AES), etc. Tokens are anonymous in that one cannot use a token to identify a particular device or its user/owner. Tokens can be rotated or changed periodically to prevent the tokens from being tracked by other devices, and the devices being subjected to frequency or pattern attacks. In some implementations, users can regain their anonymity by simply changing the cryptographic keys for their token generator.

In some implementations, the devices 112, 116 can use the same non-unique identifier (e.g., the same MAC address) for anonymous broadcasts. The non-unique identifier can be provided by the trusted service, for example. In some implementations, the tokens can be anonymously broadcasted using Bluetooth technology. For example, a data payload containing a non-unique identifier can be included in the Bluetooth discovery beacon of a broadcasting device. The discovery beacon includes a class/type field that can be filtered against, such that non-social devices will automatically discard received tokens. To maintain anonymity, a response message to the discovery beacon can use a fixed dummy MAC address to disguise its identity. Recognizing the dummy MAC address, the devices 112, 116 can interpret the payload as a token instead of a normal response to a discovery beacon.

Using Bluetooth protocol, a group of devices within transmission range of each other can exchange and store tokens without establishing a realtime communication link. This can be implemented, for example, by overloading data in discovery beacons, inquiry scan requests or extended inquiry scan requests. The non-unique identifier could be transmitted using these methods and not just using the discovery beacon. The size or membership of a group can be defined by the transmission range provided by the communication technology employed. For example, Bluetooth technology can provide a transmission range of about 10 meters (30 feet). To reduce the amount of tokens that are stored by a given device, a filter can be implemented on the receiving device to allow every nth token to be stored. Alternatively, or in addition to filters, the repetition rate for broadcasting tokens can be reduced on the broadcasting device. In some implementations, a detected token is stored once and each successive detection of the same token results in a counter being incremented. Thus, each token can be associated with a count in addition to a timestamp. If a token has a high count, then one can presumed that the device associated with the high-count token was in proximity with the receiving device for a longer period of time then other devices. Thus, token counts can be used to generate a score that indicates a level of quality of the contact which can be used for organizing and managing Groups.

In some implementations, the user can set a count threshold so that only tokens having counts that exceed a predetermined threshold are stored. Such a feature would have the affect of reducing the membership of a group by eliminating devices that only briefly entered the transmission range of a Group during a contact event and whose users would likely not want to be a member of the Group.

In some implementations, cache memory on the device can be used to store tokens and token metadata (e.g., timestamps, location information). When the cache becomes full, the cache contents can be uploaded to the trusted service 104, as described in reference to FIG. 3B. The uploading of tokens and token metadata to the trusted service 104 can be performed automatically or manually in response to a trigger event or on a scheduled basis. Some examples of trigger events can include but are not limited to: token storage capacity falling below a threshold value, power falling below a threshold value, device activation, syncing of the device with a host device, failure to receive tokens within a predetermined time window, user interaction with the device, etc. In some implementations, the token metadata can include device clock parameters that the trusted service 104 can use to synchronize timestamps from multiple devices in a Group.

To further explain the concept of token exchange, a scenario at rock concert will now be described. In this example scenario, a number of attendees of a rock concert set their Bluetooth-enabled devices to Token Exchange mode. All devices within transmission range of each other at the concert and that are set in Token Exchange mode begin exchanging and storing tokens. These devices are collectively referred to as a Group, and the users associated with devices in the Group are referred to as Group members. The Token Exchange is referred to as a "contact event." The contact event can be associated with a "contact time" defined by timestamps provided to the trusted service.

Either during the concert or sometime thereafter, each of the members upload their collected tokens to the trusted service 104. The trusted service can be a trusted third party that maintains a secure database 110 of device data, member data and encryption keys and/or other secret data. The database 110 includes additional information and data that can be used by the trusted service 104 to form Groups based on tokens, as described in reference to FIG. 2. Members can set up accounts with the trusted service 104 using secure communication channels. For example, a member can subscribe to a service by signing up through a website or portal operated by the trusted service 104. Personal information and secret data can be provided by the member to the trusted service 104 through the secure website or portal. More traditional communication channels can also be used, such as a postal service or telephone service. In some implementations, the devices uploading tokens and the trusted service communicate using symmetric key encryption. The trusted service is therefore "trusted" to have the appropriate keys for associating token sets with devices and/or users. Other encryption and authentication schemes (e.g., asymmetric key encryption, message digests, authentication, elliptic encryption, digital signatures) can also be used for secure communication between devices and the trusted service.

A key feature of the "rock concert" example described above is that a trusted service can infer the members of a group by collecting tokens from a few devices at the concert. For example, the musician's devices can exchange tokens with devices operated by users in the front row of the stadium. The front row devices can then exchange tokens with devices behind the front row, etc. Thus, token exchanges can occur in a "daisy chain" manner starting from one or more initiating devices. In this example, the musician's devices would be the group "anchor" that defines the "group." The "anchor" devices can be strategically placed around the stadium and used to triangulate the location of the users in the stadium based on their respective distances from the "anchor" devices. Since there is often enough physical separation between concertgoer devices and devices outside the stadium that the trusted service 104 can determine which devices are contained in the stadium using short-range communication technology (e.g., Bluetooth technology, Wi-Fi). In some implementations, the "anchor devices" can be access devices 114, 118.

In some implementations, additional token metadata can be generated, such as the current location of a token receiving device. For example, the token receiving device can record the time and its current position when each token is received. The token metadata can be used by the trusted service 104, for example, to further disambiguate tokens and provide a "virtual GPS" capability to devices that do not include or have access to positioning technologies.

Based on memory/storage capabilities of various devices during group formation, some devices can cache tokens to be relayed to new members of the group. The relayed tokens allow the new members to join the group without the new members being present at the Token Exchange or contact event.

Example Token Generation

An example token generation process will now be described. Let,
T=Token to be generated for a given user at a given time;
R=Token rotation period (e.g., change token every 5 minutes);
N=Current time ("now") rounded down to the nearest R (e.g., if R=5 minutes, then 1:13 PM is rounded down to 1:10 PM);
K=User's secret "key" for generating a unique sequence of tokens; and
h(x)=A cryptographically strong one-way hashing algorithm with input "x".

Let T be defined as $$T=f(K|N) \quad [1]$$

The token T can be the hash of the key and time concatenated ("|" means concatenation). The token T can be transmitted repeatedly for the rotation period R. Suppose there are two devices A, B whose clocks are out of sync. For the sake of simplicity, time will be measured from device A's perspective and device B's clock is 7 minutes faster than device A's clock. In this example scenario, device B computes a token:

$$T_b=f(K_b|N_b) \quad [2]$$

When device A receives a token, device A determines if the token is from a known device (e.g., a friend's device). In this example, assuming that device A suspects that the token is from device B and that device A has device B's secret key, then device A can compute its own token:

$$T_a=f(K_a|N_a) \quad [3]$$

In this scenario, $T_a$ does not match $T_b$ since the current time, $N_a$, for device A is 7 minutes behind the current time, $N_b$, for device B.

To sync tokens from devices A and B, in some implementations, device A can compute $T_{b-1}$, $T_b$ and $T_{b+1}$. Device A can then determine that $T_{b+1}$ matches the received token $T_b$. Device A can record that the token $T_b$ of device B is 1 rotation period R ahead of the token $T_a$ of device A. Device A can apply the same offset (e.g., 1 rotation period R) for subsequent tokens it receives from device B.

In some implementations, device A can tag the received the token received from device B with device A's local time. When device A uploads its tokens to the trusted service, device A can also include the local time. The trusted service (which has an accurate sense of time) can compute the difference between device A's clock and a reference clock. The same process can be performed for device B's tokens uploaded to the trusted service. If device A and/or device B changes their local time between token uploads to the trusted service, the devices A and B can include in their respective token uploads an indicator that a local time change has occurred. The trusted service can use this indicator to normalize or correct the token time-stamps. For example, the device A or device B can upload a difference between old and new local times, or the trusted service can compute the difference by logging local times.

In some implementations, device A can suspect a particular token belongs to device B if the token was broken down into "fast" and "slow" changing components. The slow component can be a code that is n-bits long (e.g., 4-bits). If the first n-bits of the code change at a slower rate (e.g., every hour), then device A can re-compute the slow code for device B and use the slow code as a hash to reduce the number of full f(x) computations. To ensure anonymity, however, the slow code can be sized to prevent the user of device A from being tracked by the slow code alone.

Example Trusted Service Process

Figure 2:
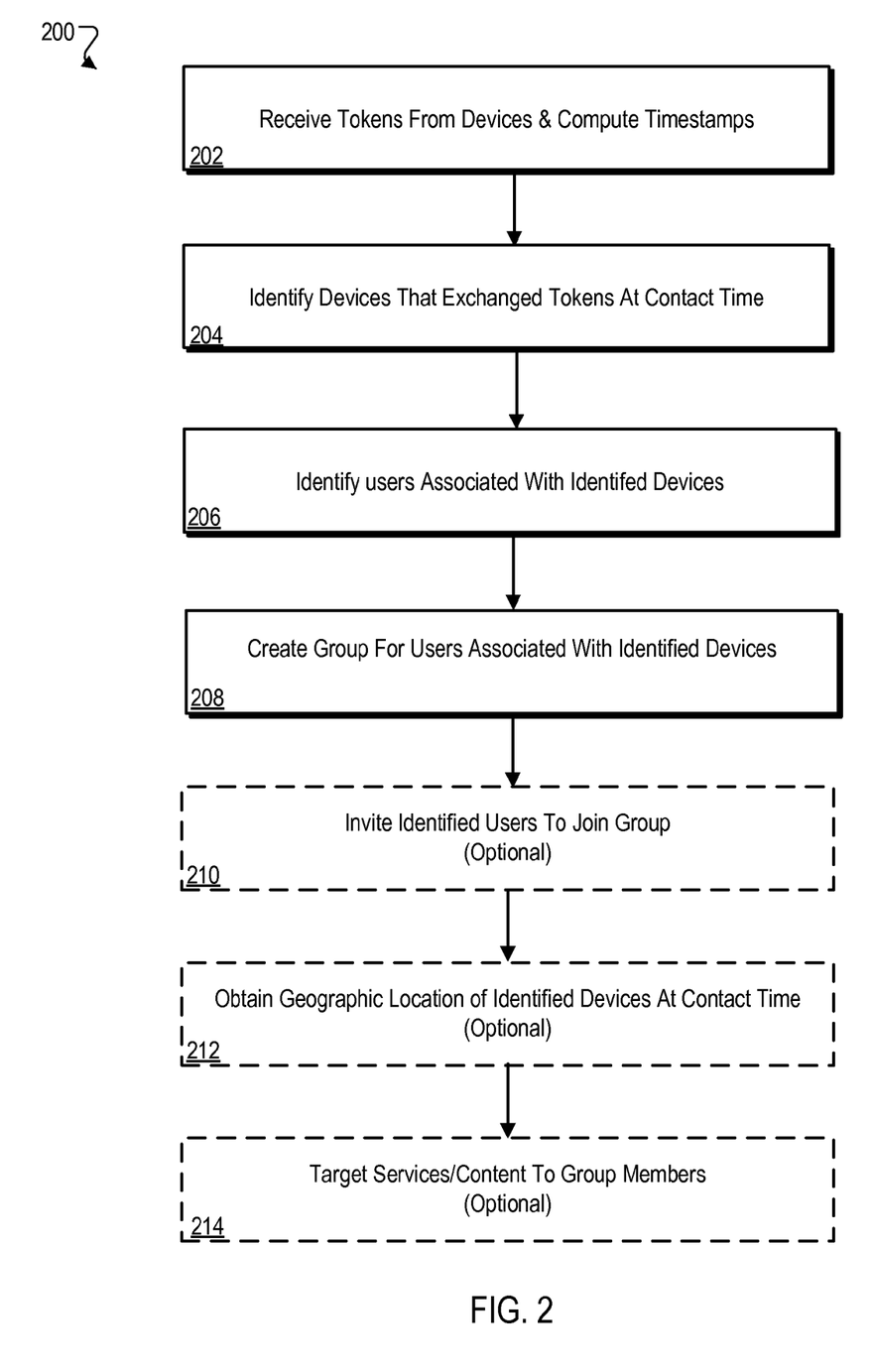
FIG. 2 is a flow diagram of an example process performed by a trusted service to form groups.

FIG. 2 is a flow diagram of an example process 200 performed by a trusted service (e.g., trusted service 104) to form Groups. In some implementations, the process 200 begins when the trusted service receives tokens from devices and computes timestamps to indicate when the tokens were received by the device (202). Tokens can be received directly from devices in the Groups during a contact event or from an access device in the Group (e.g., access device 114). The tokens can be received periodically from devices or in response to trigger events. The trusted service can store the tokens in an indexed database (e.g., database 110). The tokens can be organized into token repositories that are associated with the individual devices that collected the tokens. For example, devices 112a, 112b and 112c can each have a token repository in the database. The token repositories can be associated with devices 112a, 112b, 112c, using identifying information in the form of one or more device identifiers (e.g., MSID, DID, ICCID, IMSI, SIM, USIM). Each time a device uploads a new batch of tokens, the trusted service stores those tokens in the token repository associated with the device identifier(s). The trusted service can periodically run maintenance processes on the token repositories. For example, the trusted service can delete tokens based on their age or other criteria which can be user definable.

After the token repositories are populated with tokens, the trusted service can identify Groups of devices that have exchanged tokens at a contact time (204). In some implementations, the trusted service analyzes token repositories for a specified time window based on the timestamps to define a "token set." In some implementations, the timestamps can be synchronized using a symmetric cipher as a pseudo random number generator (PRNG). If a device generates symmetric keys that rotate every x minutes, then x/2 minutes of clock drift can be tolerated. For example, a rotation period of one minute would tolerate 30 seconds of drift. A symmetric cipher based on a PRNG can be used to compute tokens before and after the current token. These tokens can allow the device to adjust for larger clock mismatches. A clock offset of given device can be determined by comparing (e.g., differencing) the device clock with a reference clock operated by the trusted service 104 (e.g., a server clock). The comparison can occur when the device uploads tokens to the trusted service 104. The device clock can be transmitted with the tokens, assuming the latency of the upload channel is low. Once a device's clock offset from realtime is known, the token time-stamps associated with the device can be adjusted using the clock offset. In some implementations, token metadata can be generated indicating if the user has changed their clock. This feature ensures that the user cannot program a fake time to fool the trusted service 104.

In some implementations, the analysis performed by the trusted service includes matching tokens sets. For example, two token sets with large numbers of matching tokens can be a strong indication that those devices were within transmission range of each other at a contact time in the past and exchanged tokens. Such devices can be tagged by the trusted service as belonging to a Group. The Group can be given a unique identifier to facilitate further processing by the trusted service.

Figure 5A:
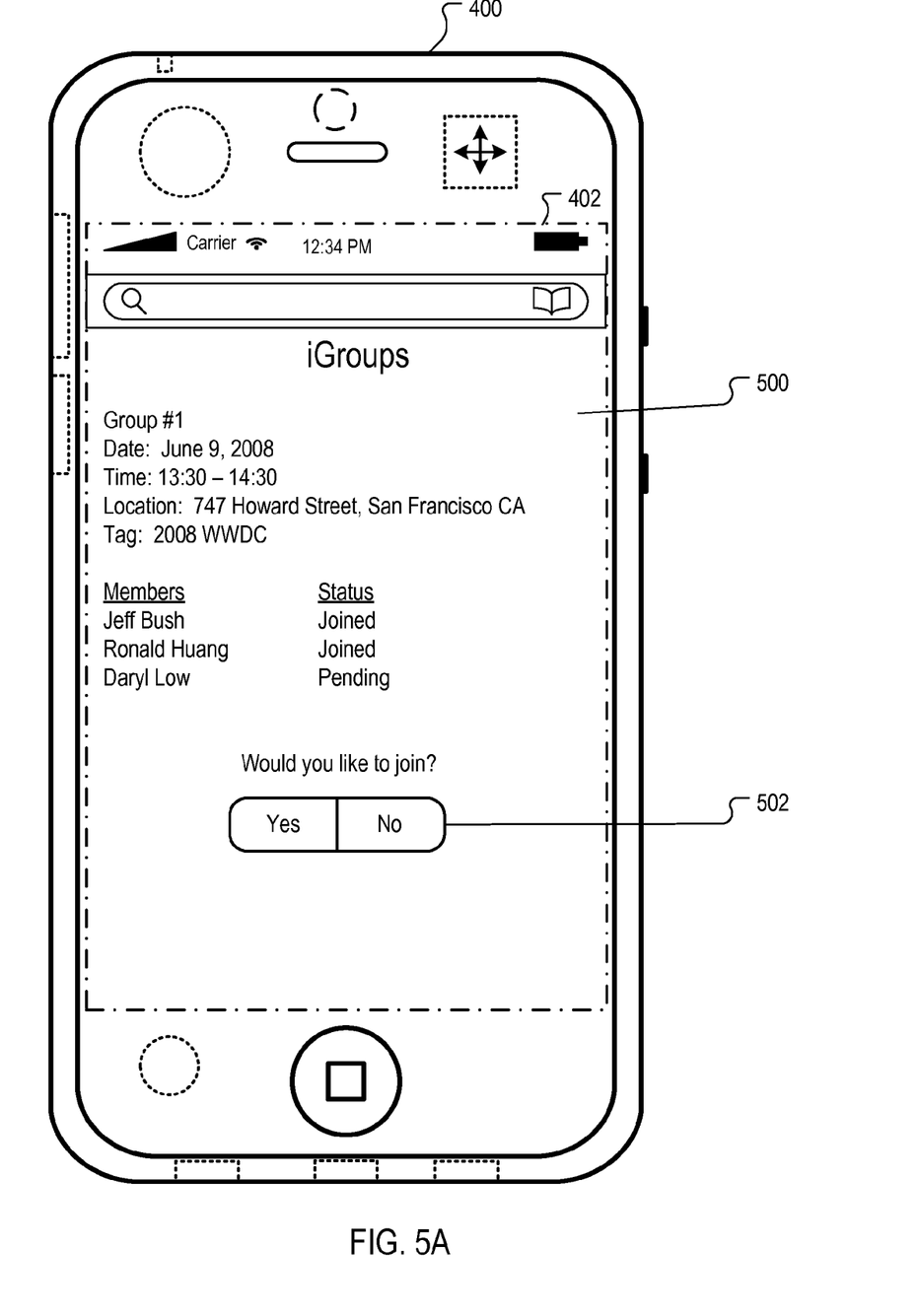
FIG. 5A illustrates an example user interface for allowing a user to join a group formed in accordance with the process of FIG. 2.

In some implementations, a score can be computed based on the number of successful matches. The score can be used to order a list of Groups for a particular user, so that the Group with the highest score is displayed at the top of a Group list presented to the user, as is shown in FIG. 5A.

Once a Group of devices has been identified, users associated with the identified devices can also be identified using member data stored in the database (206), and a Group can be created for the users (208). In some implementations, the Group can be a social network and the trusted service can optionally invite the users to join the Group (210). The invitation can be displayed on a graphical user interface of the device, as described in reference to FIGS. 5A and 5B. A geographic location of identified devices at a contact time can be obtained (212). The trusted service can receive location information from one or more of the devices or an access device. In some implementations, when a member joins a Group, the location can be used to target members with location-based services or content (214) (e.g., coupons, advertisements). The content can be provided by the trusted service or a content provider (e.g., the content provider 106).

In some implementations, a device (e.g., an access device 114) can also provide a geographic location (e.g., position coordinates) to the trusted service. With the geographic information the location of the Group during the time window is known and the members of the Group can be targeted with location-based services. Referring to the previous concert example, the concert attendees in a Group can be sent coupons to purchase music or other items related to the concert or invited to join a fan club of the performer, etc.

In another example, several people could meet and exchange tokens at a coffee shop. The coffee shop has an access device (e.g., a Wi-Fi router) that is capable of broadcasting and receiving tokens. The access device can send to the trusted service the tokens collected from the devices and the location of the access device. The location information allows the trusted service to determine the location of the Group during the time window and provide location-based services. For example, coupons for free coffee can be sent to the Group members.

Example Device Processes

Figure 3A:
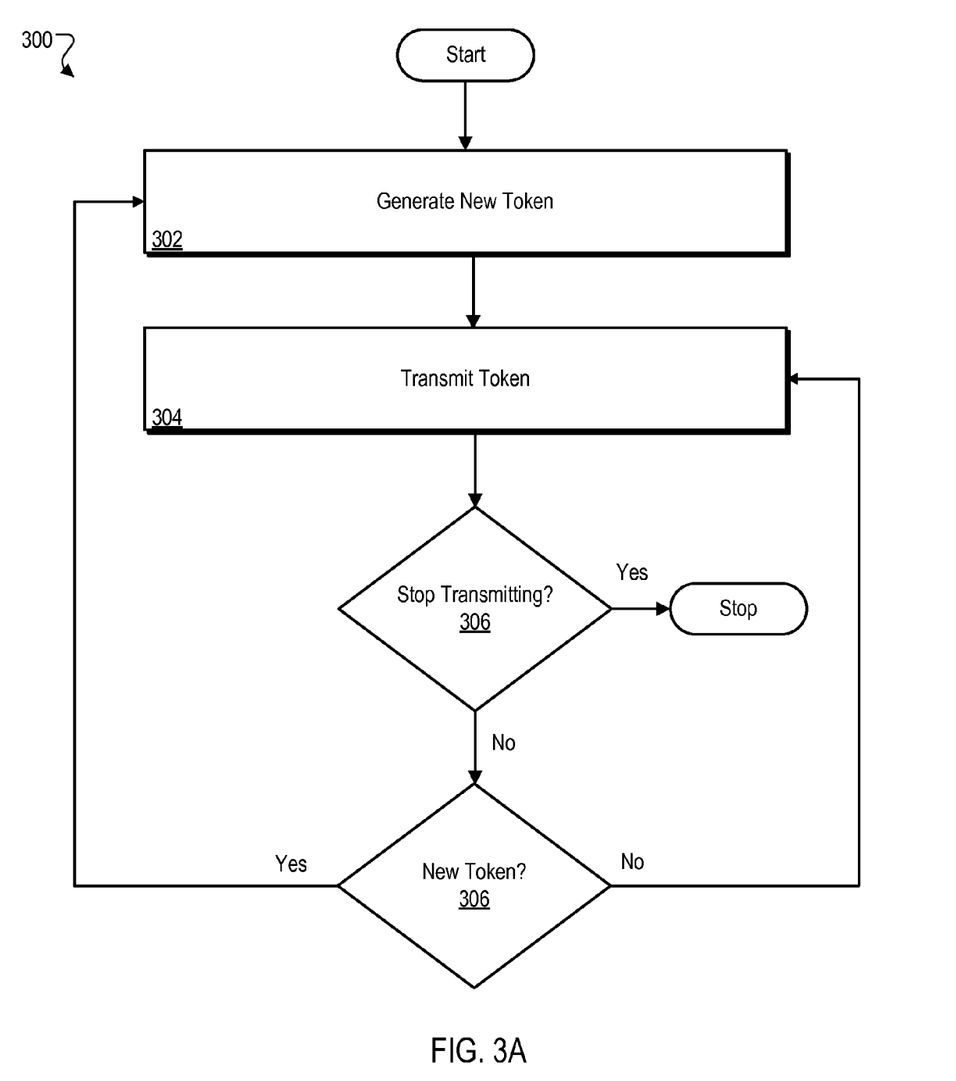
FIG. 3A is a flow diagram of an example process performed by a device for broadcasting tokens to other devices.

FIG. 3A is a flow diagram of an example process 300 performed by a device for broadcasting tokens to other devices. In some implementations, the process 300 begins when the device generates a new token (302). If Bluetooth technology is used, this can occur when the user sets their device into an Inquiry state. The token is broadcast to other devices (304) until commanded (e.g., by a device processor) to stop transmitting (306). Periodically, a command can be issued to generate a new token (306) and the process repeats step 302. The new token can be generated to prevent hackers from performing frequency or pattern analysis attacks on devices during contact events. Devices that are set in Inquiry Scan state can receive the tokens. The transmission range of the tokens is based on the communication technology used.

Figure 3B:
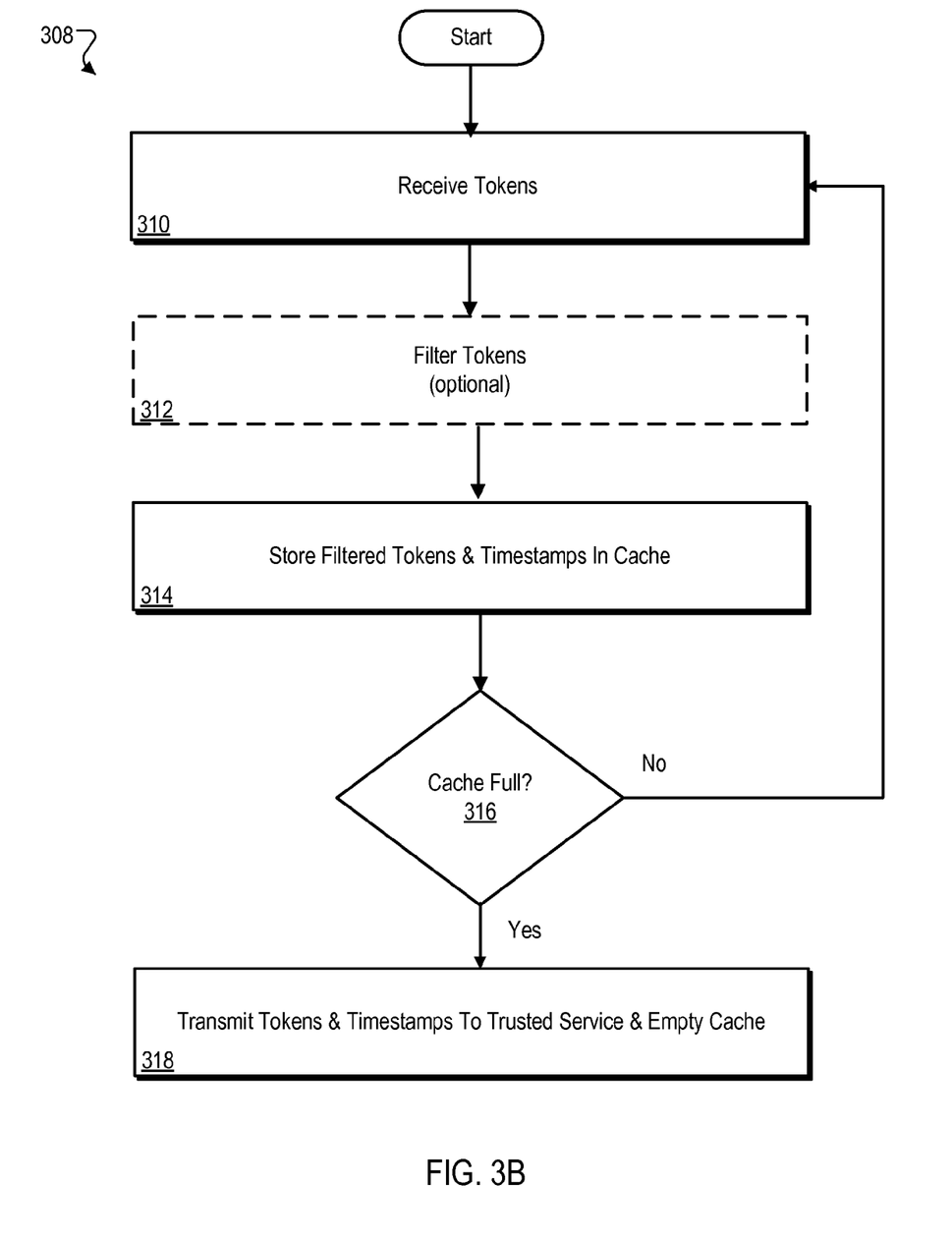
FIG. 3B is a flow diagram of an example process performed by a device for receiving tokens broadcasted by other devices.

FIG. 3B is a flow diagram of an example process 308 performed by a device (including an access device) for receiving tokens broadcasted by other devices during a contact event. In some implementations, the process 300 begins when the device receives tokens from other devices (310). The device can optionally filter the tokens to reduce their number (312). For example, the device can filter out every x token received from a given broadcasting device. Alternatively, filters can be applied to eliminate spurious tokens from passing devices based on toke counts. For example, a rule can be implemented by the receiving device that a token from a given device will only be stored if it is received n times within a predetermined receive window of time. The tokens that pass the filters are stored on the device (314). For example, a cache memory can be reserved on the device for storing tokens. Tokens can persist on the device by storing in non-volatile memory (e.g., a hard disk, flash memory). If the cache is full (316), the device can transmit the tokens and corresponding timestamps to a trusted service and empty the cache (318).

A timestamp can be generated by the receiving device for each token received using an internal clock of the device or a received clock (e.g., a GPS clock, Internet Time Service (ITS), network clock using Network Time Protocol (NTP)). In some implementations, the device may receive additional information from other devices, such as messages for use in computing time offsets. The tokens, timestamps and additional information, if any, can be compressed prior to being sent to the trusted service using any suitable compression technique (e.g., LZW). If the device is location aware, then geographic location information can also be transmitted to the trusted service for use in providing location-based services or content.

Example Mobile Device

Figure 4:
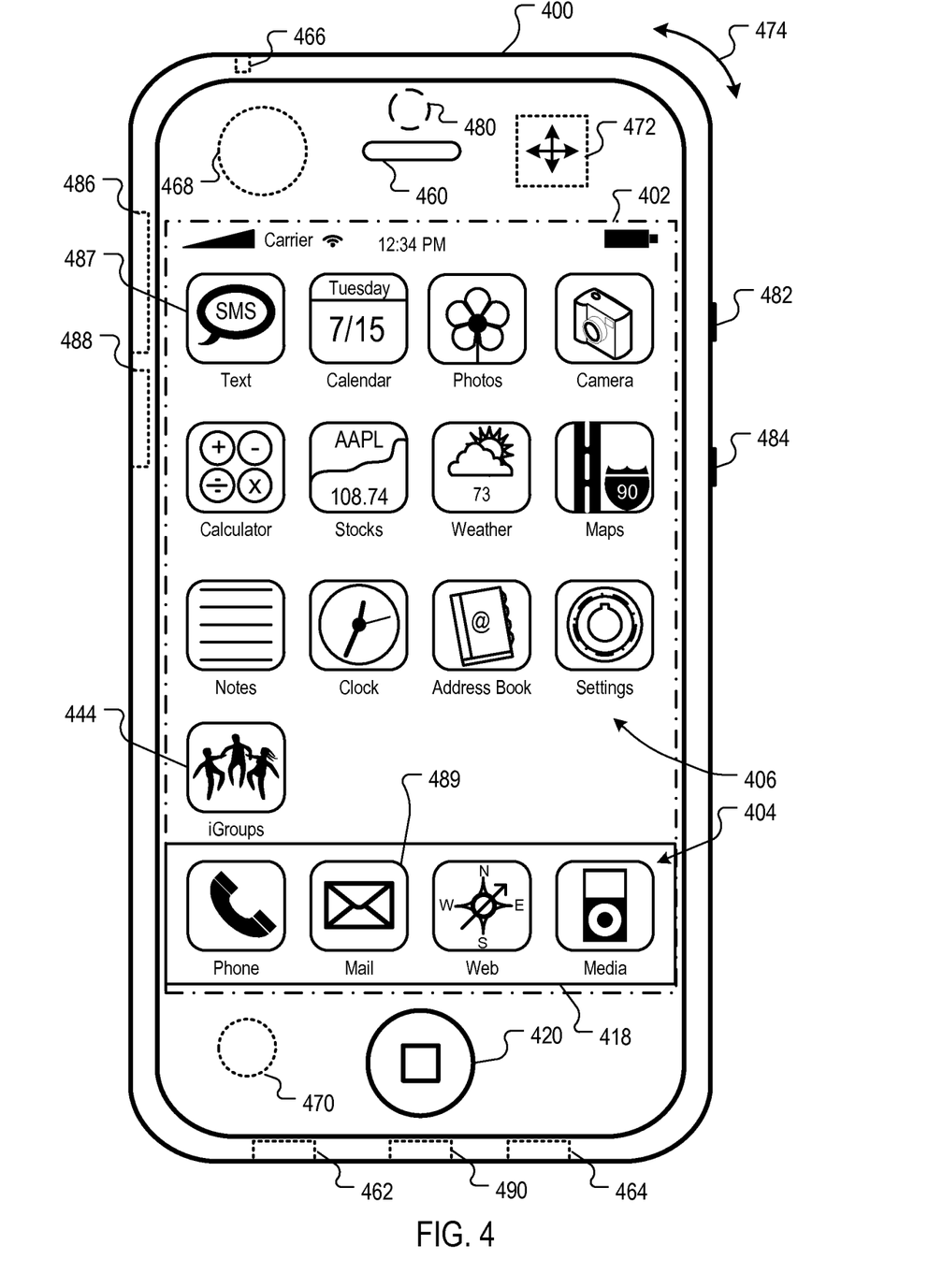
FIG. 4 illustrates an example home screen of a mobile device that performs the processes of FIGS. 3A and 3B.

FIG. 4 is a block diagram of an example mobile device 400. The mobile device 400 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 400 includes a touch-sensitive display 402 or pad. The touch-sensitive display 402 can implement liquid crystal display (LCD) technology, light emitting polymer display (LPD) technology, or some other display technology. The touch sensitive display 402 can be sensitive to haptic and/or tactile contact with a user.

In some implementations, the touch-sensitive display 402 can comprise a multi-touch-sensitive display 402. A multi-touch-sensitive display 402 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 400 can display one or more graphical user interfaces on the touch-sensitive display 402 for providing the user access to various system objects and for conveying information to the user. In some implementations, the graphical user interface can include one or more display objects 404, 406. In the example shown, the display objects 404, 406, are graphic representations of system objects. Some examples of system objects include device functions, applications, windows, files, alerts, events, or other identifiable system objects.

In some implementations, the mobile device 400 can implement multiple device functionalities, such as a telephony device, an e-mail device, a network data communication device, a Wi-Fi base station device and a media processing device. In some implementations, particular display objects 404 can be displayed in a menu bar 418. In some implementations, device functionalities can be accessed from a top-level graphical user interface ("home screen"), such as the graphical user interface illustrated in FIG. 4. Touching one of the display objects 404 can, for example, invoke corresponding functionality. For example, touching the display object 489 would invoke an email application on the mobile device 400 for sending text and geographic location data files.

In some implementations, the mobile device 400 can implement network distribution functionality. For example, the functionality can enable the user to take the mobile device 400 and provide access to its associated network while traveling. In particular, the mobile device 400 can extend Internet access (e.g., Wi-Fi) to other wireless devices in the vicinity. For example, mobile device 400 can be configured as a base station for one or more devices. As such, mobile device 400 can grant or deny network access to other wireless devices.

In some implementations, upon invocation of device functionality, the graphical user interface of the mobile device 400 changes, or is augmented or replaced with another user interface or user interface elements, to facilitate user access to particular functions associated with the corresponding device functionality. For example, in response to a user touching a phone object, the graphical user interface of the touch-sensitive display 402 may present display objects related to various phone functions; likewise, touching of an email object may cause the graphical user interface to present display objects related to various e-mail functions; touching a Web object may cause the graphical user interface to present display objects related to various Web-surfing functions; and touching a media player object may cause the graphical user interface to present display objects related to various media processing functions.

In some implementations, the top-level graphical user interface environment or state of FIG. 4 can be restored by pressing a button 420 located near the bottom of the mobile device 400. In some implementations, each corresponding device functionality may have corresponding "home" display objects displayed on the touch-sensitive display 402, and the top-level graphical user interface environment of FIG. 4 can be restored by pressing the "home" display object.

In some implementations, the top-level graphical user interface can include additional display objects 406, such as a short messaging service (SMS) object, a calendar object, a photos object, a camera object, a calculator object, a stocks object, a weather object, a maps object, a notes object, a clock object, an address book object, a settings object. In the example shown, a display object 444 can be touched to invoke the user interface shown in FIG. 5A.

Additional and/or different display objects can also be displayed in the graphical user interface of FIG. 4. For example, if the device 400 is functioning as a base station (e.g., an access point 114) for other devices, one or more "connection" objects may appear in the graphical user interface to indicate the connection. In some implementations, the display objects 406 can be configured by a user, e.g., a user may specify which display objects 406 are displayed, and/or may download additional applications or other software that provides other functionalities and corresponding display objects.

In some implementations, the mobile device 400 can include one or more input/output (I/O) devices and/or sensor devices. For example, a speaker 460 and a microphone 462 can be included to facilitate voice-enabled functionalities, such as phone and voice mail functions. In some implementations, an up/down button 484 for volume control of the speaker 460 and the microphone 462 can be included. The mobile device 400 can also include an on/off button 482 for a ring indicator of incoming phone calls. In some implementations, a loud speaker 464 can be included to facilitate hands-free voice functionalities, such as speaker phone functions. An audio jack 466 can also be included for use of headphones and/or a microphone.

In some implementations, a proximity sensor 468 can be included to facilitate the detection of the user positioning the mobile device 400 proximate to the user's ear and, in response, to disengage the touch-sensitive display 402 to prevent accidental function invocations. In some implementations, the touch-sensitive display 402 can be turned off to conserve additional power when the mobile device 400 is proximate to the user's ear.

Other sensors can also be used. For example, in some implementations, an ambient light sensor 470 can be utilized to facilitate adjusting the brightness of the touch-sensitive display 402. In some implementations, an accelerometer 472 can be utilized to detect movement of the mobile device 400, as indicated by the directional arrow 474. Accordingly, display objects and/or media can be presented according to a detected orientation, e.g., portrait or landscape. In some implementations, the mobile device 400 may include circuitry and sensors for supporting a location determining capability, such as that provided by the Global Positioning System (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 400 or provided as a separate device that can be coupled to the mobile device 400 through an interface (e.g., port device 490) to provide access to location-based services.

In some implementations, the port device 490, e.g., a Universal Serial Bus (USB) port, or a docking port, or some other wired port connection, can be included. The port device 490 can, for example, be utilized to establish a wired connection to other computing devices, such as other communication devices 400, network access devices, a personal computer, a printer, a display screen, or other processing devices capable of receiving and/or transmitting data. In some implementations, the port device 490 allows the mobile device 400 to synchronize with a host device using one or more protocols, such as, for example, the TCP/IP, HTTP, UDP and any other known protocol.

The mobile device 400 can also include a camera lens and sensor 480. In some implementations, the camera lens and sensor 480 can be located on the back surface of the mobile device 400. The camera can capture still images and/or video.

The mobile device 400 can also include one or more wireless communication subsystems, such as an 802.11b/g communication device 486, and/or a Bluetooth™ communication device 488. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Group User Interfaces

FIG. 5A illustrates an example user interface for allowing a user to join a group formed in accordance with the process 200 of FIG. 2. In some implementations, when the user touches the display object 444 ("iGroups"), the user interface 500 is displayed on the touch-sensitive display 402. The user interface 500 invites a user to join a Group formed by the trusted service 104, as described in reference to FIG. 2. A user interface element 502 (e.g., a button) is provided for joining. An option to join later (not shown) can also be presented to the user. Other user interface elements can be included for moving to previous pages, exiting the user interface, etc.

In the example shown, the trusted service formed a Group #1 which includes identified users Jeff Bush, Donald Huang and Daryl Low. The Group was based on a contact that occurred on Jun. 9, 2008, at 747 Howard Street, San Francisco, Calif. In this example, the mobile device 400 belongs to Daryl Low who is being invited to join the Group #1. Under a Status column, the device indicates that Jeff Bush, Donald Huang have joined the Group. Daryl Low is listed as "pending" since he has not yet joined. Also displayed is a tag field which includes the name "2008 WWDC." A personal "tag" can be provided by each of the Group members and changed later by that member. The tags facilitate searching a database of Groups stored at the trusted service 104 or locally on the device 400, as described in reference to FIG. 5B.

The user interface 500 is one example of possible user interface design. Other designs are possible, including designs with more or fewer user interface elements (e.g., including animated elements and transitions) and which convey more or less information to the user.

Figure 5B:
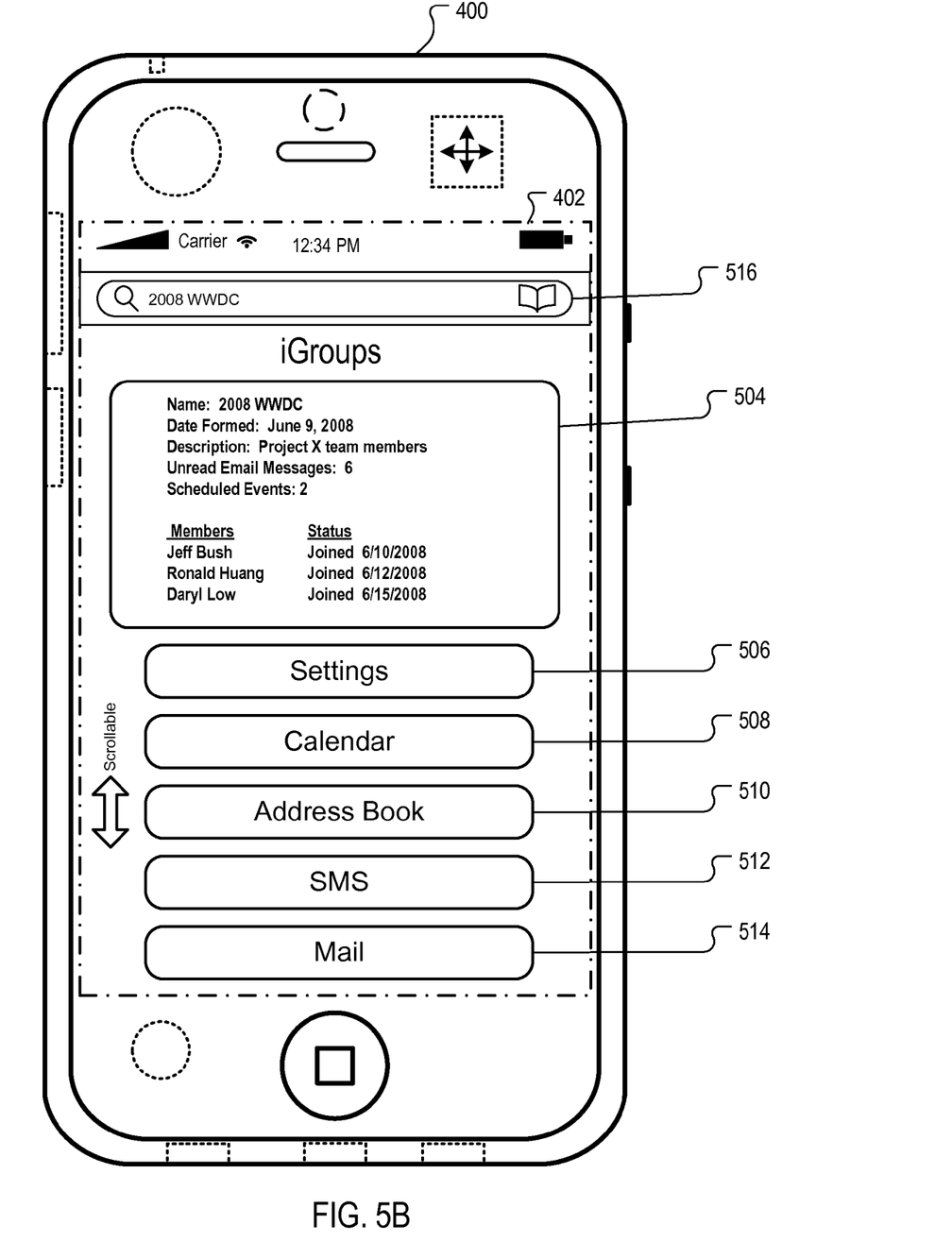
FIG. 5B illustrates an example user interface for allowing a user to manage their groups formed in accordance with the process of FIG. 2.

FIG. 5B illustrates an example user interface for allowing a user to manage groups formed in accordance with the process of FIG. 2. Continuing with the example of FIG. 5A, Daryl has now joined Group 2008 WWDC as indicated by his joined status. A profile 504 is displayed summarizing information about the Group, including the name, date formed, a description, a number of unread emails from Group members, a number of scheduled calendar events for the Group. Other information can be provided as desired.

In addition to the profile 504, several option buttons can be presented. A Settings option 506 can be used to enter a settings page to allow the user to set various parameters related to the Group, such as communication parameters related to calendars, contacts, SMS and mail services. A Calendar option 508 launches a calendar application or service which can provide a calendar populated with calendar events related to the Group and include tools for managing calendar events. An Address Book option 510 can be used to launch and address book application or service which can provide and address book that can be populated with contact information of Group members. An SMS option 512 can be used to launch an SMS application or service for sending instant messages to Group members, including broadcast messages to all members. A Mail option 514 launches a mail application or service for emailing members.

Other applications can be included as desired. The applications can be independent applications or services provided by a single applications. The applications can be executed by the mobile device 400 or provided by a network-based service (e.g., Web service). In some implementations, additional options can be viewed by applying a "flicking" gesture to the touch-sensitive display 402 with one or more fingers. The flicking gesture can cause the user interface to scroll up or down, revealing additional options. One additional option can be the option to delete a Group.

In some implementations, a search field 516 can be provided to allow users to search for Groups using search queries (e.g., using the tag 2008 WWDC). Thus, a user can store hundreds of Groups in a repository at the trusted service 104 or other network storage provider and search those Groups from their device. Users can also use bookmarks to categorize Groups (e.g., Favorite Groups).

In some implementations, tokens can be used to track the movements of a device. In such an embodiment, the tokens are like "cookie crumbs" that are left behind at different geographic locations. A trusted service can use the tokens to construct a map display with placemarks identifying geographic locations of contact events. The placemarks can be shared with other users.

Network Operating Environment

Figure 6:
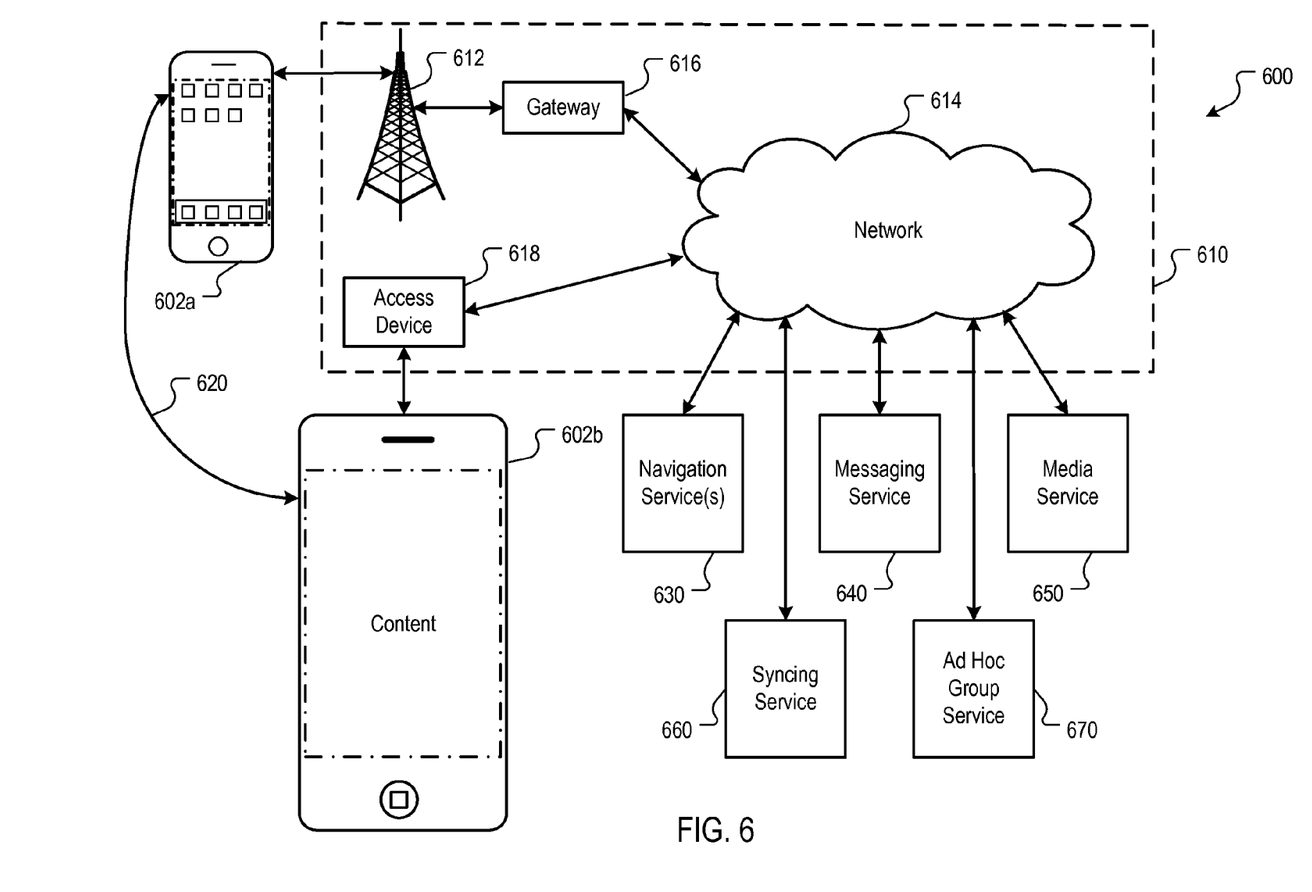
FIG. 6 is a block diagram of an example operating environment for the mobile device of FIG. 4.

FIG. 6 is a block diagram of an example network operating environment for the mobile device of FIG. 4. Mobile devices 602a and 602b can, for example, communicate over one or more wired and/or wireless networks 610 in data communication. For example, a wireless network 612, e.g., a cellular network, can communicate with a wide area network (WAN) 614, such as the Internet, by use of a gateway 616. Likewise, an access device 618, such as an 802.11g wireless access device, can provide communication access to the wide area network 614.

In some implementations, both voice and data communications can be established over the wireless network 612 and the access device 618. For example, the mobile device 602a can place and receive phone calls (e.g., using VoIP protocols), send and receive e-mail messages (e.g., using POP3 protocol), and retrieve electronic documents and/or streams, such as web pages, photographs, and videos, over the wireless network 612, gateway 616, and wide area network 614 (e.g., using TCP/IP or UDP protocols). Likewise, in some implementations, the mobile device 602b can place and receive phone calls, send and receive e-mail messages, and retrieve electronic documents over the access device 618 and the wide area network 614. In some implementations, the mobile device 602a or 602b can be physically connected to the access device 618 using one or more cables and the access device 618 can be a personal computer. In this configuration, the mobile device 602a or 602b can be referred to as a "tethered" device.

The mobile devices 602a and 602b can also establish communications by other means. For example, the wireless device 602a can communicate with other wireless devices, e.g., other mobile devices 602a or 602b, cell phones, etc., over the wireless network 612. Likewise, the mobile devices 602a and 602b can establish peer-to-peer communications 620, e.g., a personal area network, by use of one or more communication subsystems, such as the Bluetooth™ communication devices 112, 116 shown in FIG. 1. Other communication protocols and topologies can also be implemented.

The mobile device 602a or 602b can, for example, communicate with one or more services 630, 640, 650, 660, and 670 over the one or more wired and/or wireless networks. For example, one or more navigation services 630 can provide navigation information, e.g., map information, location information, route information, and other information, to the mobile device 602a or 602b. A user of the mobile device 602b can invoke a map functionality, e.g., by pressing a maps object on the top-level graphical user interface shown in FIG. 4, and can request and receive a map for a particular location, request and receive route directions, or request and receive listings of businesses in the vicinity of a particular location, for example.

A messaging service 640 can, for example, provide e-mail and/or other messaging services (e.g., SMS). A media service 650 can, for example, provide access to media files, such as song files, audio books, movie files, video clips, and other media data. In some implementations, separate audio and video services (not shown) can provide access to the respective types of media files. A syncing service 660 can, for example, perform syncing services (e.g., sync files). A Group formation service 670 can, for example, perform the processes described in reference to FIG. 2. Other services can also be provided, including a software update service that automatically determines whether software updates exist for software on the mobile device 602a or 602b, then downloads the software updates to the mobile device 602a or 602b where the software updates can be manually or automatically unpacked and/or installed.

The mobile device 602a or 602b can also access other data and content over the one or more wired and/or wireless networks. For example, content publishers, such as news sites, RSS feeds, web sites, blogs, social networking sites, developer networks, etc., can be accessed by the mobile device 602a or 602b. Such access can be provided by invocation of a web browsing function or application (e.g., a browser) in response to a user touching, for example, a Web object.

Example Mobile Device Architecture

Figure 7:
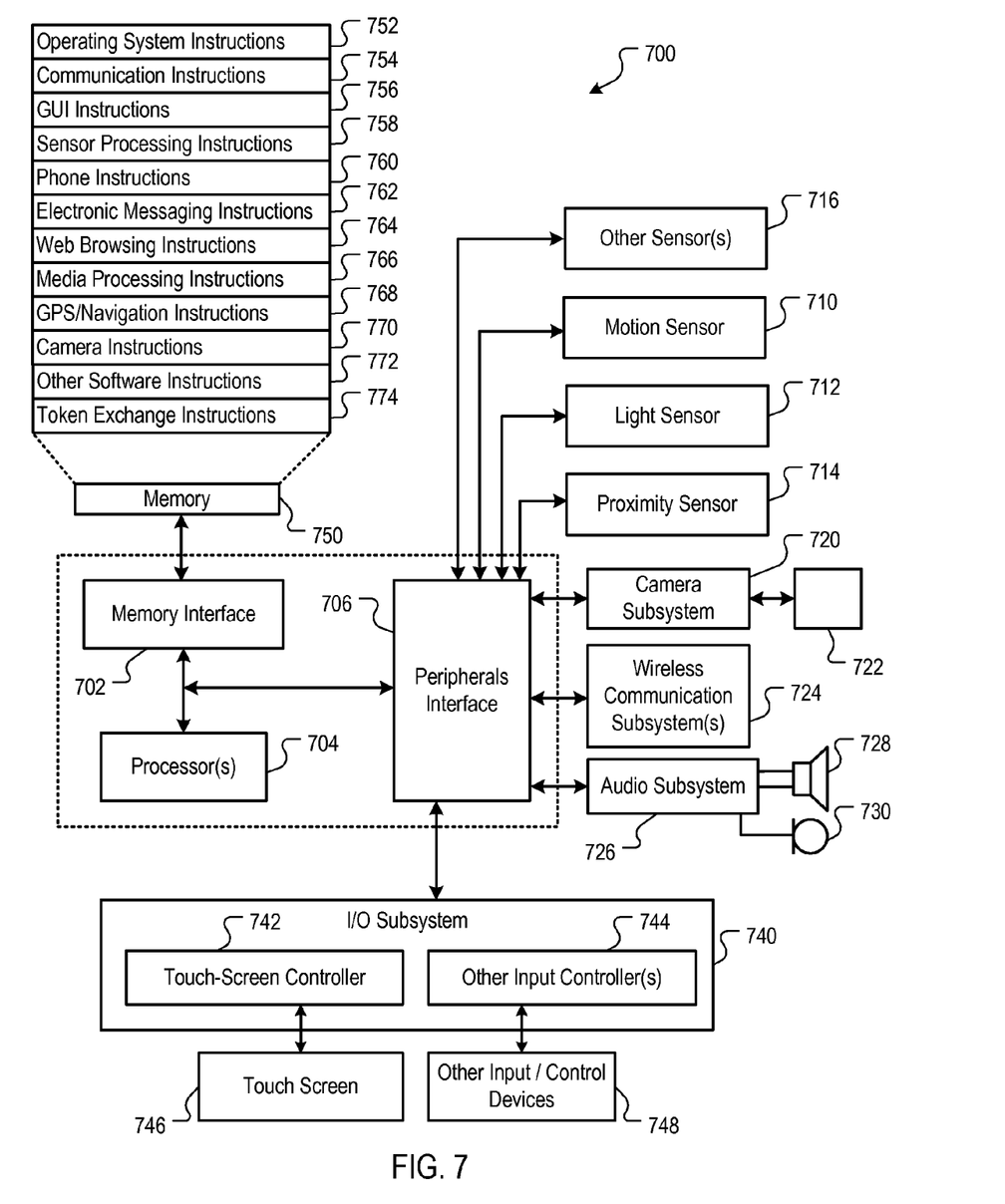
FIG. 7 is a block diagram of an example architecture for the mobile device of FIG. 4.

FIG. 7 is a block diagram of an example architecture for the mobile device of FIG. 4. The mobile device 400 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the mobile device 100 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate the orientation, lighting, and proximity functions described with respect to FIG. 4. Other sensors 716 can also be connected to the peripherals interface 706, such as a positioning system (e.g., GPS receiver), a temperature sensor, a biometric sensor, or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the mobile device 400 is intended to operate. For example, a mobile device 400 may include communication subsystems 724 designed to operate over a GSM network, a GPRS network, an EDGE network, a Wi-Fi or WiMax network, and a Bluetooth network. In particular, the wireless communication subsystems 724 may include hosting protocols such that the device 400 may be configured as a base station for other wireless devices.

An audio subsystem 726 can be coupled to a speaker 728 and a microphone 730 to facilitate voice-enabled functions, such as voice recognition, voice replication, digital recording, and telephony functions.

The I/O subsystem 740 can include a touch screen controller 742 and/or other input controller(s) 744. The touch-screen controller 742 can be coupled to a touch screen 746 or pad. The touch screen 746 and touch screen controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration may disengage a lock of the touch screen 746; and a pressing of the button for a second duration that is longer than the first duration may turn power to the mobile device 400 on or off. The user may be able to customize a functionality of one or more of the buttons. The touch screen 746 can, for example, also be used to implement virtual or soft buttons and/or a keyboard.

In some implementations, the mobile device 400 can present recorded audio and/or video files, such as MP3, AAC, and MPEG files. In some implementations, the mobile device 400 can include the functionality of an MP3 player, such as an iPod™. The mobile device 400 may, therefore, include a pin connector that is compatible with the iPod. Other input/output and control devices can also be used.

The memory interface 702 can be coupled to memory 750. The memory 750 can include high-speed random access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks. The operating system 752 may include instructions for handling basic system services and for performing hardware dependent tasks. In some implementations, the operating system 752 can be a kernel (e.g., UNIX kernel).

The memory 750 may also store communication instructions 754 to facilitate communicating with one or more additional devices, one or more computers and/or one or more servers. The memory 750 may include graphical user interface instructions 756 to facilitate graphic user interface processing; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes and instructions; camera instructions 770 to facilitate camera-related processes and functions; and/or other software instructions 772 to facilitate other processes and functions, e.g., security processes and functions. The memory 750 may also store other software instructions (not shown), such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 750. The token exchange instructions 774 can be used to implement the processes described in reference to FIGS. 3A and 3B.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the mobile device 400 may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving, at a trusted service, tokens that do not identify a particular device, at least some of the tokens having been received by a first device from a first plurality of devices and at least some of the tokens having been received by a second device from a second plurality of devices, the tokens having corresponding timestamps;
comparing, at the trusted service, at least some of the tokens and timestamps received by the first device to at least some of the tokens and timestamps received by the second device;
based on the comparison, determining, at the trusted service, that the first device and the second device have collected one or more matching tokens within a first timeframe;
identifying, at the trusted service, users associated with the first device and the second device; and
creating, at the trusted service, a group for the identified users.

2. The method of claim 1, further comprising:
determining a geographic location of the first and second devices; and
targeting users in the group with location based services based on the geographic location.

3. The method of claim 2, where targeting further comprises:
sending content to one or more users in the group.

4. The method of claim 1, where the tokens comprise cryptographic material.

5. The method of claim 1, where the tokens are periodically changed.

6. The method of claim 1, where the first and second devices include one or more of wireless devices and wired devices.

7. The method of claim 2, where the geographic location is provided by an access device or based on the location of an access device.

8. A method performed by a device, comprising:
receiving, at a first device, tokens from a plurality of devices, wherein the tokens do not identify a particular device or its user or owner, the tokens having corresponding timestamps;
sending, from the first device, the received tokens to a trusted service; and
receiving, from the trusted service, information describing a group of users associated with devices that received tokens in a first timeframe determined to be matching tokens by the trusted service, the group of users identified by the trusted service by a comparison of at least some of the tokens and timestamps received by the devices.

9. The method of claim 8, further comprising:
receiving from the trusted service, an invitation to join the group of users;
receiving input accepting the invitation to join;
sending the input to the trusted service; and
receiving from the trusted service, information confirming that the user has joined the group.

10. The method of claim 8, further comprising:
sending location information to the trusted service; and
receiving a location-based service or content based on the location information.

11. The method of claim 8, further comprising:
broadcasting cryptographic tokens.

12. The method of claim 11, where the cryptographic tokens are periodically changed.

13. A computer-readable storage device having instructions stored thereon, which, when executed by a processor, causes the processor to perform operations comprising:
receiving, at a trusted service, tokens that do not identify a particular device, at least some of the tokens having been received by a first device from a first plurality of devices and at least some of the tokens having been received by a second device from a second plurality of devices the tokens having corresponding timestamps;
comparing, at the trusted service, at least some of the tokens and timestamps received by the first device to at least some of the tokens and timestamps received by the second device;
based on the comparison, determining, at the trusted service, that the first device and the second device have collected one or more matching tokens in a first timeframe;
identifying, at the trusted service, users associated with the first device and the second device; and
creating, at the trusted service, a group for the identified users.

14. The computer-readable storage device of claim 13, further comprising:
determining a geographic location of the first and second devices; and
targeting users in the group with location based services based on the geographic location.

15. The computer-readable storage device of claim 14, where targeting further comprises:
sending content to one or more users in the group.

16. The computer-readable storage device of claim 13, where the tokens comprise cryptographic material.

17. The computer-readable storage device of claim 13, where the tokens are periodically changed.

18. The computer-readable storage device of claim 14, where the geographic location is provided by an access device or based on the location of an access device.

19. A computer-readable storage device having instructions stored thereon, which, when executed by a processor, causes the processor to perform operations comprising:
receiving, at a first device, tokens from a plurality of devices, wherein the tokens do not identify a particular device or its user or owner, the tokens having corresponding timestamps;
sending, from the first device, the received tokens to a trusted service; and
receiving, from the trusted service, information describing a group of users associated with devices that received tokens in a first timeframe determined to be matching tokens by the trusted service, the group of users identified by the trusted service by a comparison of at least some of the tokens and timestamps received by the devices.

20. The computer-readable storage device of claim 19, further comprising:
receiving from the trusted service, an invitation to join the group of users;
receiving input accepting the invitation to join;
sending the input to the trusted service; and
receiving from the trusted service, information confirming that the user has joined the group.

21. The computer-readable storage device of claim 19, further comprising:
sending location information to the trusted service; and
receiving a location-based service or content based on the location information.

22. The computer-readable storage device of claim 19, further comprising:

broadcasting cryptographic tokens.

23. The computer-readable storage device of claim 22, where the cryptographic tokens are periodically changed.

* * * * *